US009152620B2

(12) United States Patent
Lottridge et al.

(10) Patent No.: US 9,152,620 B2
(45) Date of Patent: *Oct. 6, 2015

(54) SYSTEM, METHOD, AND COMPUTER-READABLE MEDIUM FOR PLAGIARISM DETECTION

(71) Applicant: Pacific Metrics Corporation, Monterey, CA (US)

(72) Inventors: Susan M. Lottridge, Monterey, CA (US); Howard C. Mitzel, Seaside, CA (US); John A. Pennington, Monterey, CA (US)

(73) Assignee: Pacific Metrics Corporation, Monterey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,934

(22) Filed: Nov. 26, 2013

(65) Prior Publication Data

US 2014/0324413 A1    Oct. 30, 2014

Related U.S. Application Data

(63) Continuation of application No. 12/566,267, filed on Sep. 24, 2009, now Pat. No. 8,595,166.

(51) Int. Cl.
| | |
|---|---|
| *G06N 5/00* | (2006.01) |
| *G06Q 50/20* | (2012.01) |
| *G09B 7/00* | (2006.01) |
| *G06F 17/27* | (2006.01) |
| *G06Q 10/10* | (2012.01) |

(52) U.S. Cl.
CPC .......... *G06F 17/2765* (2013.01); *G06N 5/003* (2013.01); *G06Q 10/10* (2013.01); *G06Q 50/20* (2013.01); *G09B 7/00* (2013.01)

(58) Field of Classification Search
CPC .......... G06N 5/003; G06Q 50/20; G09B 7/00
USPC ........................................ 706/45
See application file for complete search history.

(56) References Cited

PUBLICATIONS

Duggan, et al., "Machine annotation of sets of traditional Irish dance tunes," 2008.
Heap, et al., "Scaling the detection of collusion and plagiarism across the institution," Jun. 2006.
Su, et al., "Plagiarism Detection Using the Levenshtein Distance and Smith-Waterman Algorithm," 2008.
Scherbinin, "Plagiarism Detection: the Tool and the Case Study," 2008.
Zhang, et al., "A Program Plagiarism Detection Model Based on Information Distance and Clustering," 2007.

*Primary Examiner* — Lut Wong
(74) *Attorney, Agent, or Firm* — Rothwell, Figg, Ernst & Manbeck, pc

(57) ABSTRACT

A system, method, and computer-readable medium for detecting plagiarism in a set of constructed responses by accessing and pre-processing the set of constructed responses to facilitate the pairing and comparing of the constructed responses. The similarity value generated from the comparison of a pair of constructed responses serves as an indicator of possible plagiarism.

60 Claims, 9 Drawing Sheets

SYSTEM, METHOD, AND COMPUTER-READABLE MEDIUM FOR PLAGIARISM DETECTION

CROSS-REFERENCE TO RELATED APPLICATION

The present application is a continuation of U.S. patent application Ser. No. 12/566,267, filed on Sep. 24, 2009, incorporated by reference herein in its entirety.

COPYRIGHT NOTIFICATION

Portions of this patent application contain material that is subject to copyright protection. The copyright owner has no objection to the facsimile reproduction by anyone of the patent document, or the patent disclosure, as it appears in the U.S. Patent and Trademark Office, but otherwise reserves all copyrights in the material.

BACKGROUND OF THE INVENTION

I. Field of the Invention

The present invention relates generally to systems and methods for detecting plagiarism and, more particularly, to a system and method for detecting plagiarism in a set of constructed responses.

II. Discussion of the Background Art

Schools in the United States and other parts of the world have been administering standardized tests for many years. In practice, standardized tests often include some combination of multiple choice questions and questions requiring a constructed or written response.

Multiple choice questions are a convenient way to assess achievement or ability in part because an answer is chosen from a finite set of pre-constructed responses and the answer can be scored quickly and accurately using automated techniques. However, because students are presented with pre-constructed responses, it is possible for a student to guess the right answer without having a requisite level of achievement or ability. Questions requiring a student to answer by constructing a response typically cannot be answered correctly without the student having the requisite level of achievement or ability. Constructed responses are usually graded by hand because of the difficulty in accounting for all the various ways a response may be constructed. Co-pending U.S. patent application Ser. No. 12/137,213 is directed to the automated scoring of constructed responses.

One concern when evaluating an individual's performance on the constructed or written response portions of a standardized exam is the possibility of plagiarism. Plagiarism in this context is the illegal collaboration between two or more individuals to construct a response to a test question. Plagiarism is a serious offense that can have serious consequences, such as voiding a student's test score. Because the consequences of plagiarism can adversely affect an individual's academic and/or professional career, the evidence of plagiarism should be irrefutable before disciplinary action is taken against a plagiarizer.

Plagiarism is typically manually detected. This process often involved the tedious comparison of test question responses in order to pinpoint similarities. However, because of the time commitment involved in manual plagiarism detection, the process is often rushed, conducted on an ad hoc basis, or skipped entirely. The detection of plagiarism requires systematic evaluation, such as having a human read all papers form the same lab or class. This systematic review is in direct contrast to good measurement, in which papers are randomly assigned to human readers. However, plagiarism reviews are almost always conducted at the same time as scoring due to the costs associated with an independent plagiarism review.

SUMMARY OF THE INVENTION

The primary object of the present invention is to overcome the deficiencies of the prior art described above by providing a system and method for quickly and precisely detecting plagiarism through the evaluation of multiple aspects of test question responses. Further applications and advantages of various embodiments of the present invention are discussed below with reference to the drawing figures.

According to one embodiment of the present invention, a computerized method for detecting plagiarism in a set of constructed responses is accomplished by performing a series of steps. Initially, it is necessary to access the set of constructed responses. This may or may not include the accessing of a computer database or other computerized forms of information storage. Next, the constructed responses are pre-processed. This preprocessing may or may not include the reformatting of the constructed responses, the removal of common phrases from the constructed responses, and/or the comparison of the constructed response length to a pre-determined minimum length threshold. The constructed responses are then paired for comparison. This pairing may or may not be done such that each constructed response is paired with each other constructed response. A similarity value is calculated between the paired constructed responses. This similarity value may or may not be derived from a generalized edit distance. Once the similarity value is calculated, it is compared to a similarity threshold. If the similarity value is greater than, or less than depending on the mathematical techniques used, the similarity value threshold it is determined that plagiarism has or might have occurred. The results of this process are then stored for further accessing and/or analysis.

According to one embodiment of the present invention, a system for detecting plagiarism in a set of constructed responses is provided. The system could include one or more computers with a processor and a memory device for storing a set of digital instructions. The digital instructions are executable by the processor, and instruct the computer in performing the plagiarism detection. Initially, it is necessary to access the set of constructed responses from a digital storage medium, such as: a database, hard drive, server, optical disk, etc. Next, the constructed responses are pre-processed according to the digital instructions. This preprocessing may or may not include the reformatting of the constructed responses, the removal of common phrases from the constructed responses, and/or the comparison of the constructed response length to a pre-determined minimum length threshold. The constructed responses are then paired for comparison. This pairing may or may not be done such that each constructed response is paired with each other constructed response. Further, the digital instructions may be configured to pair the constructed responses in a manor that conserves computing power. A similarity value is calculated between the paired constructed responses. This similarity value may or may not be derived from a generalized edit distance. Once the similarity value is calculated, it is compared to a similarity threshold. If the similarity value is greater than, or less than depending on the mathematical techniques used, the similar-ity value threshold it is determined that plagiarism has or might have occurred. The results of this process are then stored, in any computer accessible digital medium, for further accessing and/or analysis.

According to one embodiment of the present invention, a computer-readable storage medium having computer executable program instructions stored therein for detecting plagiarism in a set of constructed responses is provided. The instructions set forth the steps the computer will take in detecting plagiarism. Initially, it is necessary to access the set of constructed responses. This may or may not include the accessing of a computer database or other computerized forms of information storage. Next, the constructed responses are pre-processed. This preprocessing may or may not include the reformatting of the constructed responses, the removal of common phrases from the constructed responses, and/or the comparison of the constructed response length to a pre-determined minimum length threshold. The constructed responses are then paired for comparison. This pairing may or may not be done such that each constructed response is paired with each other constructed response. A similarity value is calculated between the paired constructed responses. This similarity value may or may not be derived from a generalized edit distance. Once the similarity value is calculated, it is compared to a similarity threshold. If the similarity value is greater than, or less than depending on the mathematical techniques used, the similarity value threshold it is determined that plagiarism has or might have occurred. The results of this process are then stored for further accessing and/or analysis.

While the current invention is designed to identify plagiarism, because the offense can have lasting effects on the accused it is recommended that the final decision on whether or not plagiarism has taken place be made by a person experienced in the field.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to any specific preferred embodiments described and/or illustrated herein.

Figure 1:
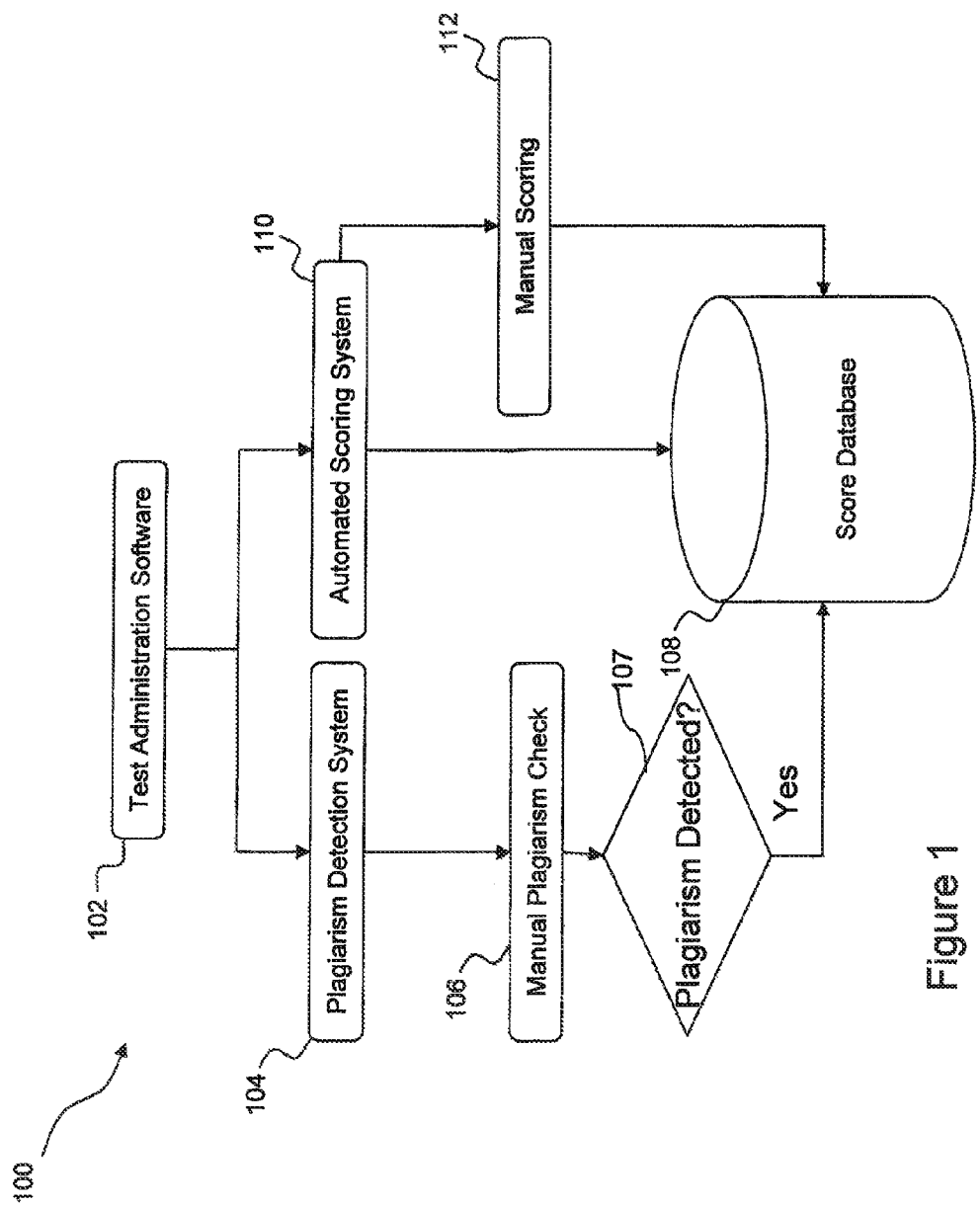
FIG. 1 is a schematic diagram illustrating the process and/or data flow in a test scoring environment configured to include a plagiarism detection system according to one embodiment of the present invention.

FIG. 1 is a schematic diagram illustrating data flow in a test scoring environment 100 configured to include a plagiarism detection system 104 according to the present invention. In FIG. 1, the test administration software 102 forwards constructed responses to both the plagiarism detection system 104 and the automated scoring system 110 in parallel. In situations where the plagiarism detection system 104 has found the possibility of plagiarism, the constructed responses that may have been plagiarized are forwarded to a manual plagiarism check 106. The results of the manual plagiarism check 106 are forwarded to the score database 108 for storage. Further, it is possible that the plagiarism detection system 104 would not find the possibility of plagiarism. In that situation no action is taken. If the plagiarism detection system flags a response for plagiarism in step 107 and that response is deemed plagiarized by a second source, then a 'void due to plagiarism' flag is posted to the score database. Acting in parallel, the automated scoring system 110 uses a non-manual process to score the constructed responses. The score results are forwarded from the automated scoring system 110 to the score database 108 for storage. In situations where the automated scoring system 110 is unable to score a constructed response, the response is subjected to manual scoring 112. The score results are forwarded from the manual scoring 112 to the score database 108 for storage. The plagiarism detection of the current invention may run in parallel to the hand or automated scoring of constructed responses.

Figure 2:
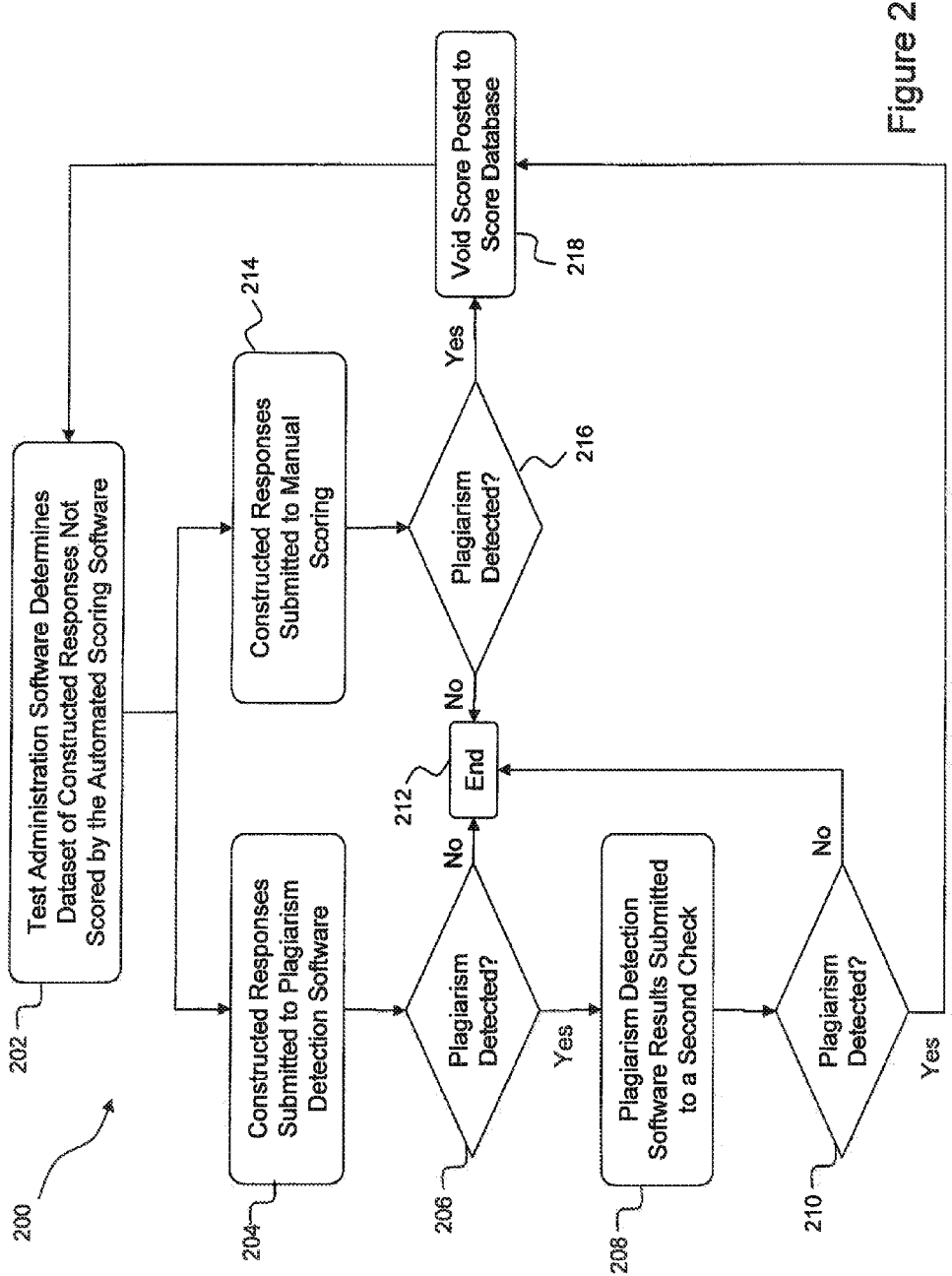
FIG. 2 is a flow diagram illustrating the process and/or data flow in a test scoring environment configured to include a plagiarism detection system according to one embodiment of the present invention.

FIG. 2 is a flow diagram illustrating the process and/or data flow in a test scoring environment 200 configured to include a plagiarism detection system according to one embodiment of the present invention. In one embodiment of the present invention, at step 202 the test administration software determines a dataset of constructed responses not scored by the automated scoring software. While this embodiment submits only constructed responses that have not yet been scored to the plagiarism detection system, the present invention is in no way limited to this implementation. For example, in another embodiment of the present invention, constructed responses might be submitted to the plagiarism detection system only after having been scored by either an automated system, manual process, or both. The constructed responses in this dataset are then either submitted to the plagiarism detection software at step 204 or are submitted to manual scoring at step 214. If the plagiarism detection software determines that plagiarism has not occurred at step 206, the process terminates at step 212. If however possible plagiarism is detected at step 206, the suspect constructed responses are submitted to a second check at step 208. This second check is necessary because the plagiarisms detection software that is used at step 204, in one embodiment of the present invention, is designed to over detect plagiarism. Thus, in one embodiment of the present invention the second check of step 208 is necessary to prevent honest responses from being reported as plagiarized. At step 210, the second check determines if plagiarism has occurred. If the second check determines that plagiarism has not occurred at step 210, the process terminates at step 212. If, on the other hand, plagiarism is confirmed at step 210, a void score is posted to the score database 108 at step 218. If the constructed responses are submitted to manual scoring at step 214 and plagiarism is detected at step 216, a void score is posted to the score database 108 at step 218. If, on the other hand, plagiarism is not detected at step 216, the process terminates at step 212. This process may be run periodically, e.g., hourly, daily, monthly, etc., or run continuously as constructed responses are received into the system, i.e. real time, or run on a user defined schedule or on an as needed basis.

Figure 3:
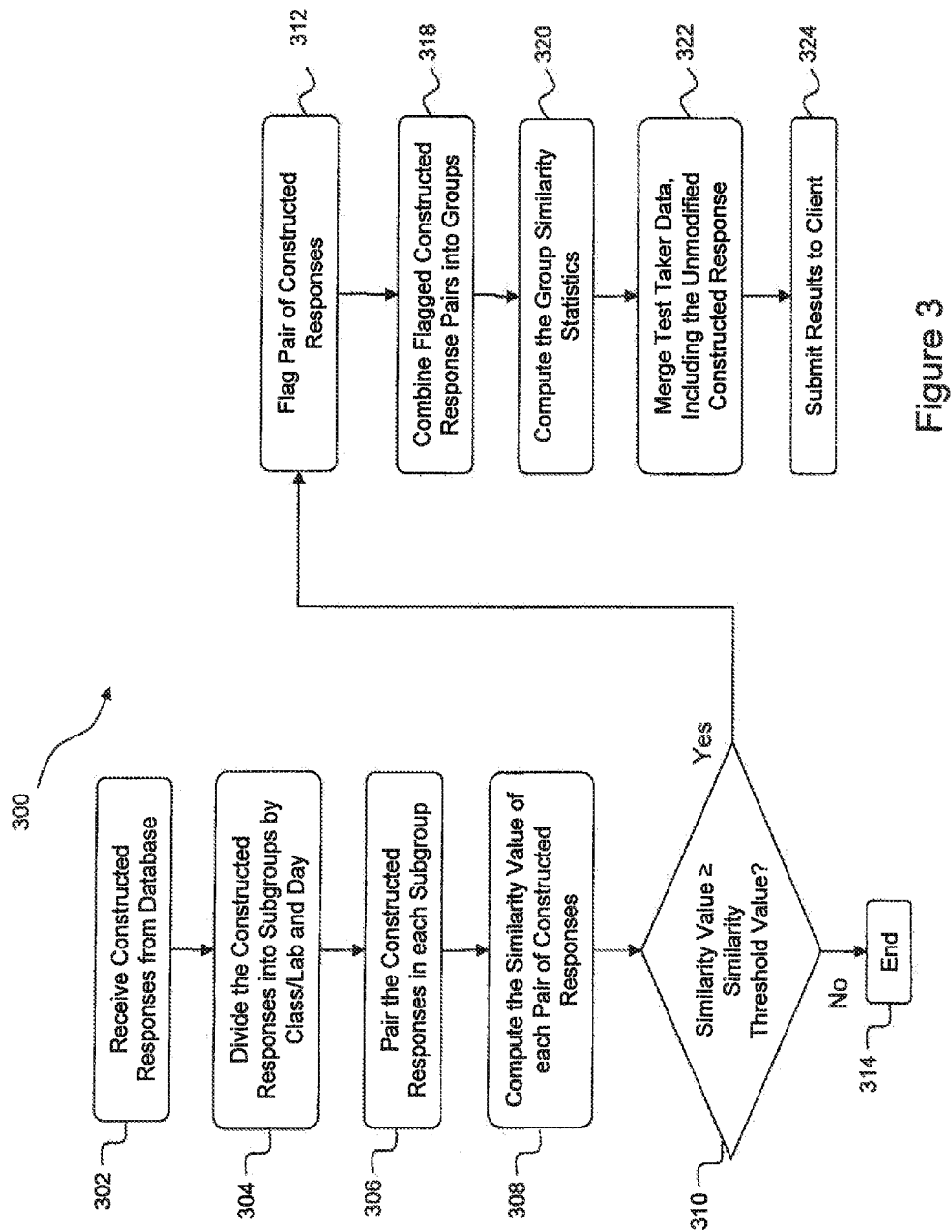
FIG. 3 is a flow diagram illustrating the process and/or data flow through a plagiarism detection system according to one embodiment of the present invention.

FIG. 3 is a flow diagram illustrating the process and/or data flow through a plagiarism detection system 300 according to one embodiment of the present invention. According to one embodiment of the present invention, constructed responses are received from a database at step 302. These constructed responses are divided into subgroups at step 304. Subgroups may include, but are not limited to, labs, classrooms, subjects, grades, schools, school districts, cities, counties, and states. Once the constructed responses have been divided into subgroups, they are paired within each subgroup at step 306. The way in which the constructed responses are paired is further described in FIG. 7. At step 308 a similarity value of each pair of constructed responses is computed. The process for computing the similarity value of the constructed response pairs is further described in FIG. 8. At step 310, the similarity value computed at step 308 is compared to a similarity value threshold. If the similarity value is equal to or greater than the similarity value threshold, plagiarism is detected, and the pair of constructed responses is flagged for further processing at step 312. If, on the other hand the similarity value is less than the similarity value threshold, the process is terminated at step 314. At step 318 the constructed response pairs are grouped according to similarity. For instance, if constructed response A is similar to constructed response B and constructed response B is similar to constructed response C, then the three constructed responses (A, B, and C) are formed into a group. Once the groups have been assembled, group similarity statistics are computed at step 320. At step 322 a results report is generated that contains merger test taker data, including the original unmodified constructed response. At step 324 the results report is sent to a client.

Figure 4:
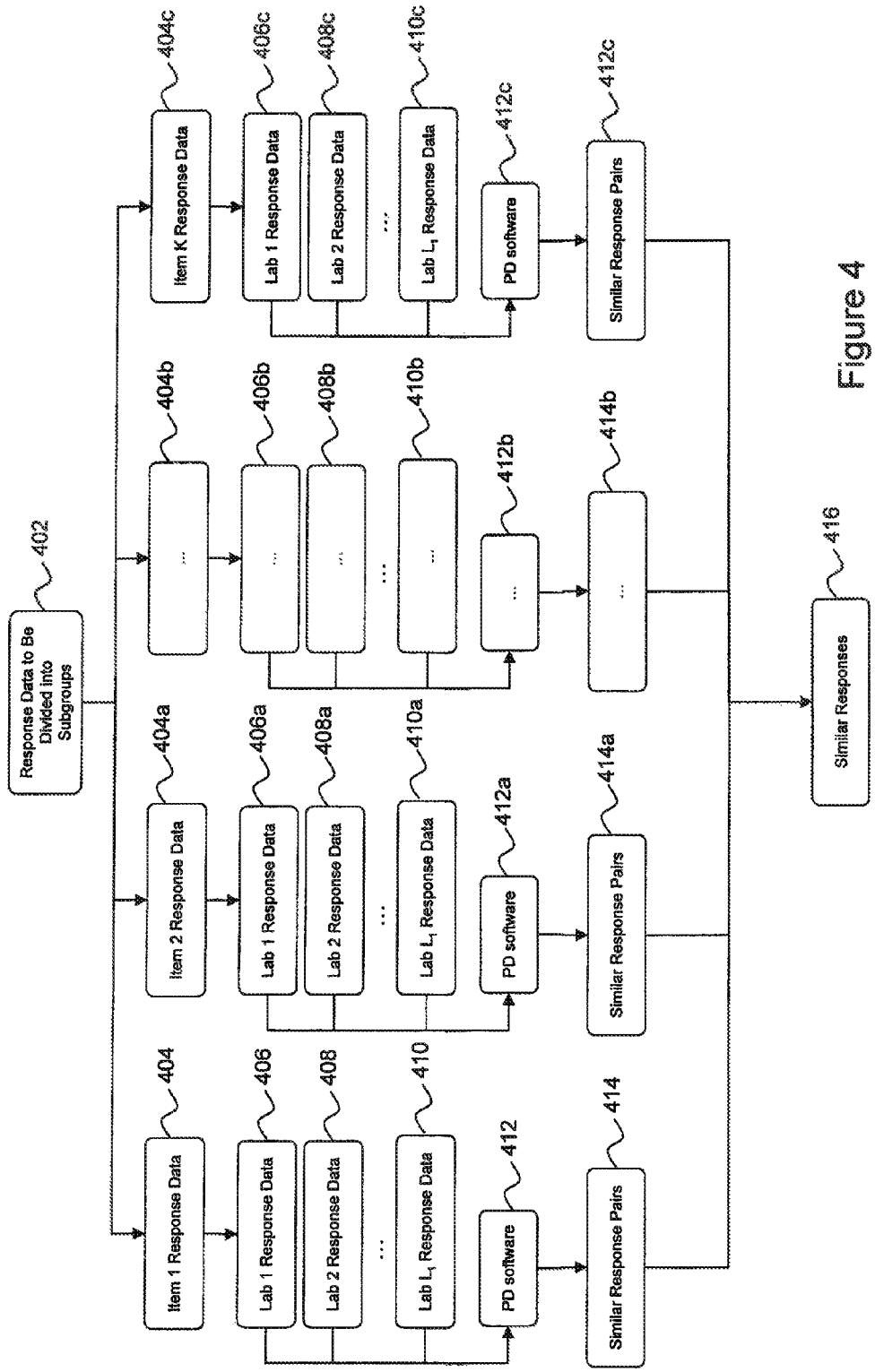
FIG. 4 is a flow diagram illustrating the process and/or data flow of dividing the constructed response data into subgroups according to one embodiment of the present invention.

FIG. 4 is a flow diagram illustrating the process and/or data flow of dividing the constructed response data into subgroups according to one embodiment of the present invention. In this embodiment the constructed responses are first grouped by item number and then grouped by lab, although, it would be appreciated that the responses can be grouped by any of the aforementioned subgroups. At step 402 the constructed response data is divided by item number. This first division produces item response data groups 404-404c. Next, each item number group 404-404c is further divided by lab 406-406c, 408-408c, 410-410c. That is item 1 response data 404 is subsequently divided into lab 1 response data 406, lab 2 responses data 408, etc. . . . Once the response data is divided by lab, each lab subgroup 406-406c, 408-408c, 410-410c is submitted to the plagiarism detection software at 412-412c. At 414-414c, the plagiarism detection software indicates which of the paired responses may involve plagiarism. The similar responses 416, as determined by the plagiarism detection software, may undergo further processing, such as the manual plagiarism check 106 described above.

Figure 5:
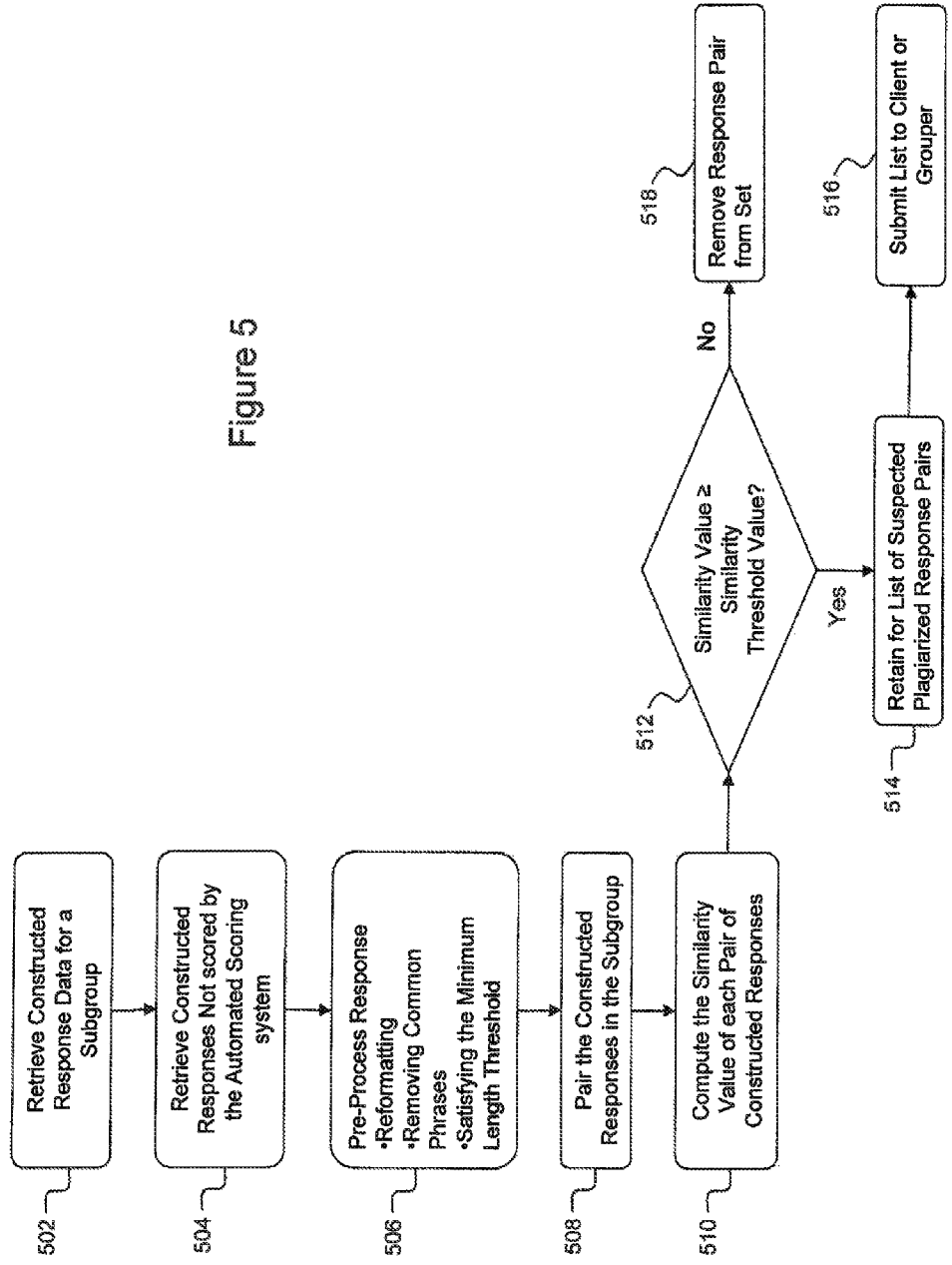
FIG. 5 is a flow diagram illustrating the process and/or data flow through a plagiarism detection system according to one embodiment of the present invention.

Pseudo code for performing the afore described grouping is found below:

○ Variables:
    ■ Nresps = number of student responses
    ■ Ch = Boolean to track changes to record
    ■ St_ids = array of all student id's
    ■ Pair_ids = array of all pair_id's
○ Initialize ch=1
○ Do while ch=1
    ■ Set Ch=0
    ■ Do k = 1 to Nresps-1 by 2 ←count up by even numbers
       • Do L=1 to Nresps
          ○ If (st_ids[k] = st_ids[l]) or (st_ids[k+1] = st_ids[l] then do the following:
            ■ Do m=1 to Nresps
              • If (pair_ids[m] = pair_ids[l] then do the following:
                ○ If (pair_ids[m] is not equal to pair_ids[k] then
                  ■ set ch=1
                  ■ Pair_ids[m]= pair_ids[k]
○ End all open loops/conditional blocks FIG. 5 is a flow diagram illustrating the process and/or data flow through a plagiarism detection system according to one embodiment of the present invention. At step 502 constructed responses are retrieved for a given subgroup. At step 504 the constructed responses are further filtered to extract only the responses not scored by the automated scoring system. While this embodiment submits only constructed responses that have not yet been scored to the plagiarism detection system, the present invention is in no way limited to this implementation. For example, in another embodiment of the present invention, constructed responses might be submitted to the plagiarism detection system only after having been scored by either an automated system, manual process, or both. At step 506, the constructed responses that have not been scored by the automated scoring system are processed in preparation for plagiarism detection. The pre-processing of the constructed responses includes, but is in no way limited to, reformatting the constructed responses, removing common phrases from the constructed responses, and checking to ensure that the constructed responses satisfy a minimum length threshold. Further, through pre-processing the constructed response may be formatted into a single string. The minimum length threshold is used to ensure that the constructed responses are of sufficient length for accurate plagiarism detection. However, plagiarism detection, according to the present invention, might be performed on shorter answers so long as the users of the system are aware of a greater margin of error. At step 508, the constructed responses are paired for comparison. This process is described in greater detail with reference to FIG. 7. At step 510, a similarity value is computed for each pair of constructed responses. This process is described in greater detail with reference to FIG. 8. At step 512, the computed similarity value is compared to a similarity threshold value to determine if plagiarism has occurred. The similarity threshold value can may be user defined, and may be adjusted to apply a more conservative or liberal approach to initial plagiarism screening. Further, a default can be applied to the similarity threshold value. If the similarity value is equal to or greater than the similarity threshold value, the pair of suspected plagiarized responses is retained at step 514. If, on the other hand, the similarity value is not equal to or greater than the similarity threshold value, the pair of constructed responses is removed from the analysis set at step 518. At step 516, the retained list of suspected plagiarized response pairs is submitted to a third-party, such as a client, or a different process for further analysis. One such process would involve grouping the suspect responses according to similarity.

Figure 6:
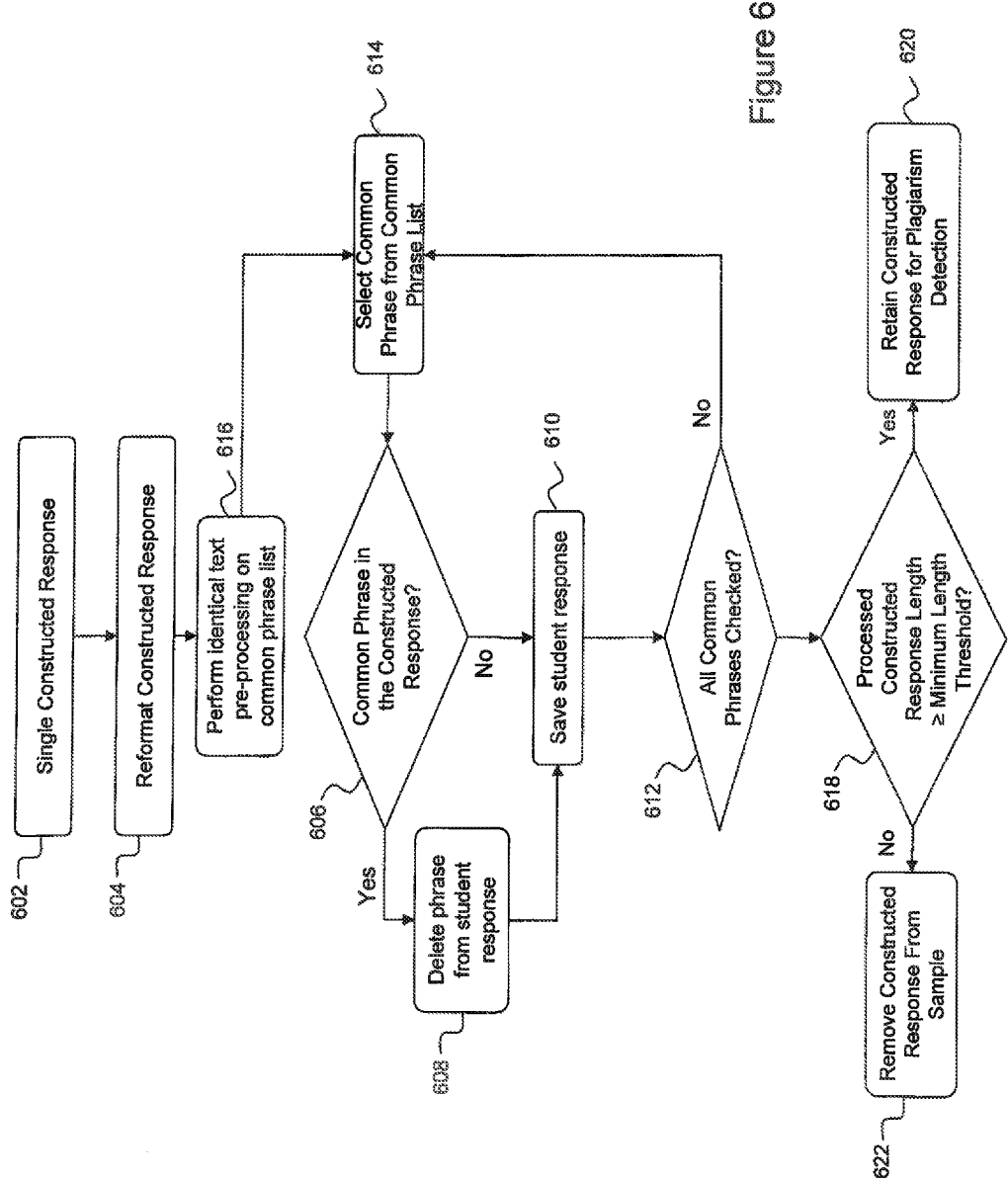
FIG. 6 is a flow diagram illustrating the process and/or data flow of pre-processing constructed responses in preparation for plagiarism detection according to one embodiment of the present invention.

FIG. 6 is a flow diagram illustrating the process and/or data flow of pre-processing constructed responses in preparation for plagiarism detection according to one embodiment of the present invention. FIG. 6 illustrates an iterative process, however the present invention is in no way limited to this embodiment. At step 602, a single constructed response is retrieved. This constructed response is reformatted at step 604. The reformatting may include, but is in no way limited to, the removal of "white space" from a constructed response, changing characters to upper case, and/or the removal of separator characters. Once the constructed response has been reformatted, a common phrase list is reformatted in the same manner at step 616. Once the common phrase list has been reformatted, a phrase is selected from the list at step 614, and it is determined if the common phrase appears in the reformatted constructed response at step 606. This comparison can be made using several different techniques including, but not limited to, identical text matching. Common phrases may include, but are not limited to, "THE ANSWER IS," "THE TOTAL IS," "THE COST OF THE," and/or "THE PRICE OF." If a common phrase is found at step 606, it is deleted from the constructed response at step 608. Once a common phrase has been deleted from a constructed response, the edited constructed response is saved at step 610. Alternatively, if no common phrase was detected in step 606, there is no editing required and the constructed response is saved at step 610. Because the process of removing common phrases can be performed iteratively, at step 612 there is a determination to confirm that all of the common phrases have been checked. If all of the common phrases have not been checked, a common phrase to be checked is once again selected at step 614, and the process repeats. Alternatively, if all of the common phrases have been checked, as determined at step 612, the processed constructed response length is compared to a minimum length threshold at step 618. The minimum length threshold is used to ensure that the constructed responses are of sufficient length for accurate plagiarism detection. The minimum length threshold may be user defined or may be applied using a default value. However, plagiarism detection, according to the present invention, might be performed on shorter answers so long as the users of the system are aware of a greater margin of error. If a constructed response is equal to or greater than the minimum length threshold, the constructed response is retained for plagiarism detection at step 620. Alternatively, if a constructed response is not equal to or greater than the minimum length threshold, the constructed response is removed from the sample set at step 622.

Figure 7:
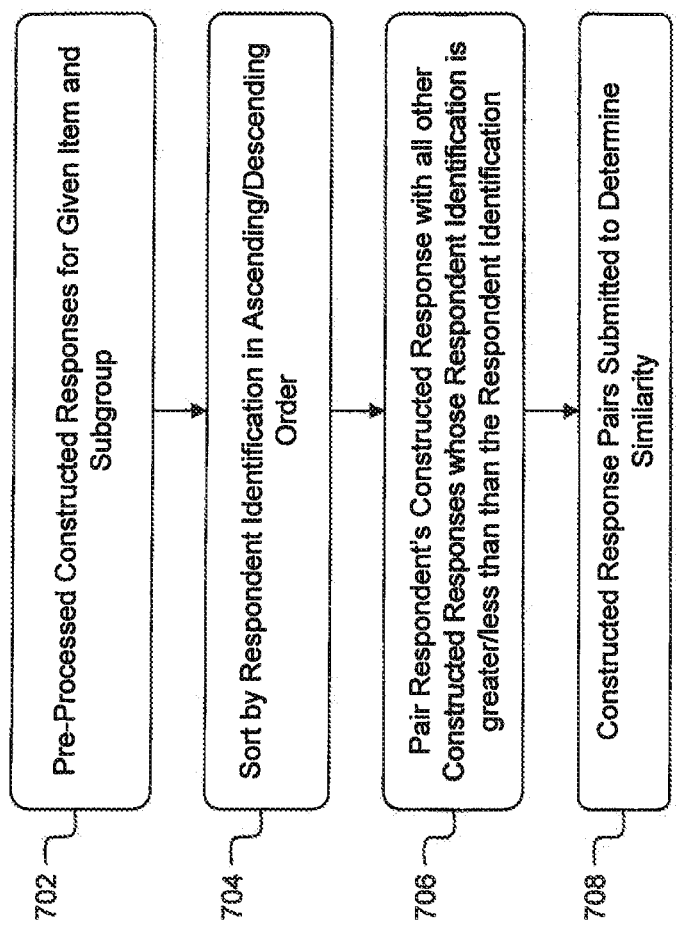
FIG. 7 is a flow diagram illustrating the process and/or data flow of pairing constructed responses in preparation for plagiarism detection according to one embodiment of the present invention.

FIG. 7 is a flow diagram illustrating the process and/or data flow of pairing constructed responses in preparation for plagiarism detection according to one embodiment of the present invention. At step 702, the pre-processed constructed responses for a given item and subgroup are retrieved or accessed. At step 704, the constructed responses are sorted using a unique identifier. The sorting may be, but is not limited to, ascending or descending order. Further, the unique identifier might be, but is not limited to, a unique respondent identification number, such as a student identification number or social security number. Once sorted, at step 706 each constructed response with a corresponding first respondent identification number is paired with either 1) each of the constructed responses corresponding to the respondent identification numbers greater than the first respondent identification number, for ascending sorts; or 2) each of the constructed responses corresponding to the respondent identification numbers less than the first respondent identification number, for descending sorts. For example, in one class, five students (Student ID Numbers 1 through 5) construct responses (Answers A-E) for one answer, as illustrated in the following table sorted in ascending respondent identification number order:

| Student ID Number | Answer |
|---|---|
| 1 | A |
| 2 | B |
| 3 | C |
| 4 | D |
| 5 | E |

Thus, according to step 706 the following pairings will be made:

| Student ID Numbers Paired | Answers Paired |
|---|---|
| 1-2 | A-B |
| 1-3 | A-C |
| 1-4 | A-D |
| 1-5 | A-E |
| 2-3 | B-C |
| 2-4 | B-D |
| 2-5 | B-E |
| 3-4 | C-D |
| 3-5 | C-E |
| 4-5 | D-E |

By paring the constructed responses in this manner, computer processing efficiency is increased, which leads to faster results and greater computing capacity. Alternatively, a matrix could be used to store combinations of paired responses. Specifically, by pairing the constructed responses in this fashion, the final file size will be $n*(n-1)/2$, where n=the total number of constructed responses to be paired. At step 708, the pairs are then submitted to a process or system to determine the similarity between the paired constructed responses.

Figure 8:
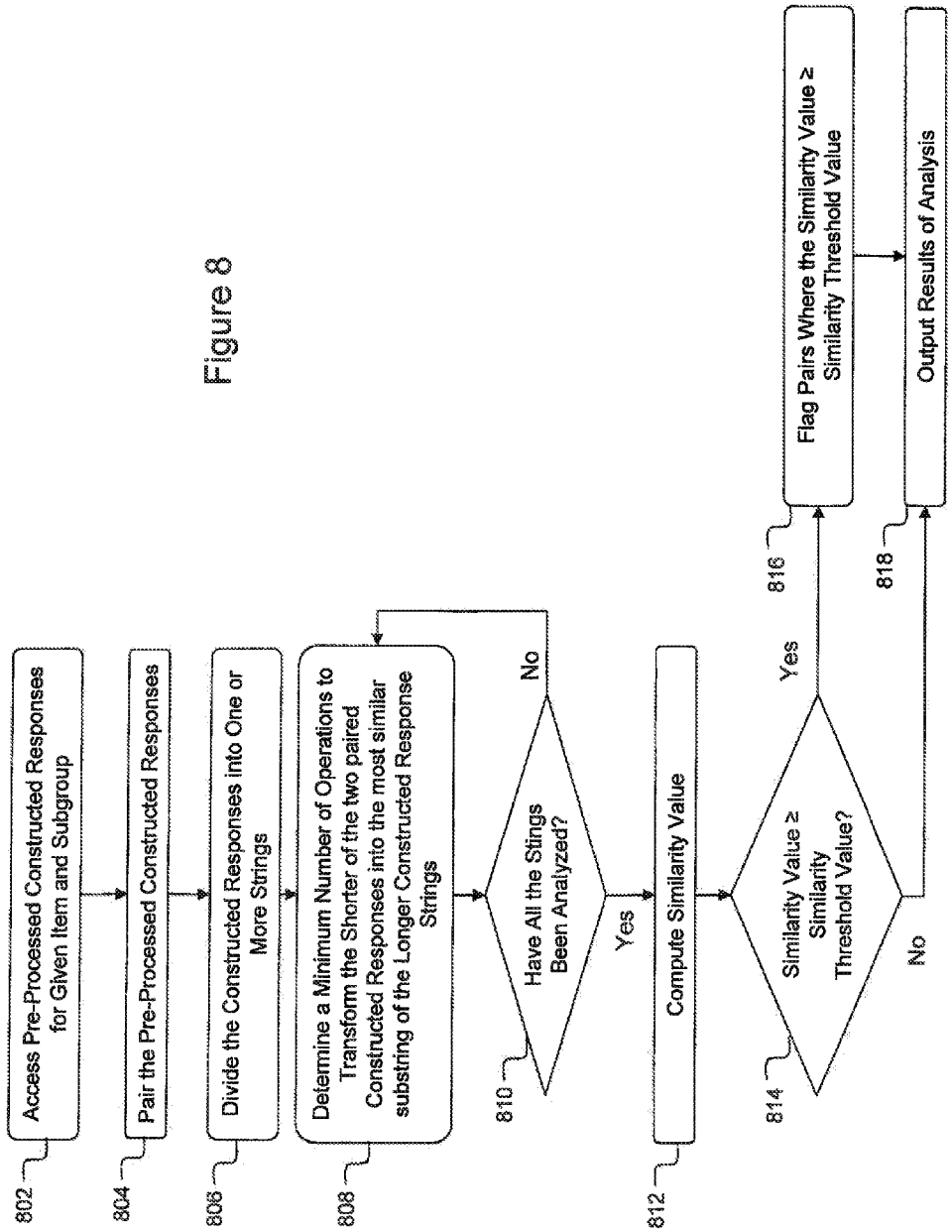
FIG. 8 is a flow diagram illustrating the process and/or data flow of plagiarism detection according to one embodiment of the present invention.

FIG. 8 is a flow diagram illustrating the process and/or data flow of plagiarism detection according to one embodiment of the present invention. At step 802, the pre-processed constructed responses for a given item and subgroup are accessed. At step 804, the pre-processed constructed responses are paired, as discussed above in regard to FIG. 7. At step 806, the paired constructed responses are then divided up into one or more strings for comparison. The number of strings compared may be adjusted to increase the accuracy of the plagiarism detection. Further, if the number of strings to be compared is one, then the constructed responses are not divided into more strings. At step 808, the minimum number of operations to transform each string of the shorter constructed responses into most similar substring in the paired longer constructed response strings is compared. In this embodiment, the shorter of the two constructed responses is compared to all substrings of the same length in the longer constructed response. The similarity value to the most similar substring is computed. According to one embodiment of the present invention, step 808 is the determination of a generalized edit distance. The generalized edit distance is related to the concept of the Levenstein edit distance.

The Levenstein edit distance is a way to measure the amount of difference between to strings or sequences, i.e. the edit distance. The edit distance is given by the minimum number of operations needed to transform one string into the other, where an operation is an insertion, deletion, or substitution of a single character.

The generalized edit distance of the present invention may, but is not required to, ignore differences in length between compared strings and case. Further, according to one embodiment of the present invention certain operations used to transform one string into another are ignored or free. These free operations include: the addition of characters to either end of the shorter of the paired responses, and the removal of characters from either end of the longer of the paired responses. However, according to one embodiment of the present invention, it is not free to change characters within the shorter response or the substring of the longer response that is most similar to the shorter response. This insures that if, for example, a student's shorter response contains 50 plagiarized characters (the entirety of the shorter response) of another student's longer 100 character essay, the responses will still receive a similarity value of 100%. The following table contains examples of string comparisons and the number of operations to transform one into the other, i.e. the edit distance.

| Strings | Edit Distance |
|---|---|
| "Superfluous" → "Super" | 0 |
| "Superfluous" → "us" | 0 |
| "Superfluous" → "Flu" | 0 |
| "Superfluous" → "Fluid" | 2 |
| "Superfluous" → "Perfume" | 3 |
| "Superfluous" → "Upper" | 1 |

At step 810, it is determined if all of the strings of the paired responses have been analyzed. If all the substrings of the longer response have not been analyzed, the process repeats steps 808 and 810 until all of the strings have been analyzed. Once all the strings have been analyzed, the similarity value is computed at step 812. According to one embodiment of the present invention, the similarity value of two strings is computed using the following formula:

Similarity Value=(1−[Edit Distance]/MatchStringLength)*100.

The match string length is the length of the shorter of the strings compared. The similarity value may be represented as a number between 0 and 100, in which the higher the number the more similar the two strings are, and vice versa.

At step 814, the computed similarity value is compared to a similarity threshold value to determine if plagiarism has occurred. The similarity threshold value can may be user defined, and may be adjusted to apply a more conservative or liberal approach to initial plagiarism screening. If the similarity value is equal to or greater than the similarity threshold value, the pair of suspected plagiarized responses is flagged for further analysis at step 816. At step 818, the output of the plagiarism analysis is either displayed to a user, or transferred electronically to another process or system for further analysis. If, on the other hand, the similarity value is not equal to or greater than the similarity threshold value, the paired constructed responses are not flagged, and the results are still output at step 818.

Figure 9:
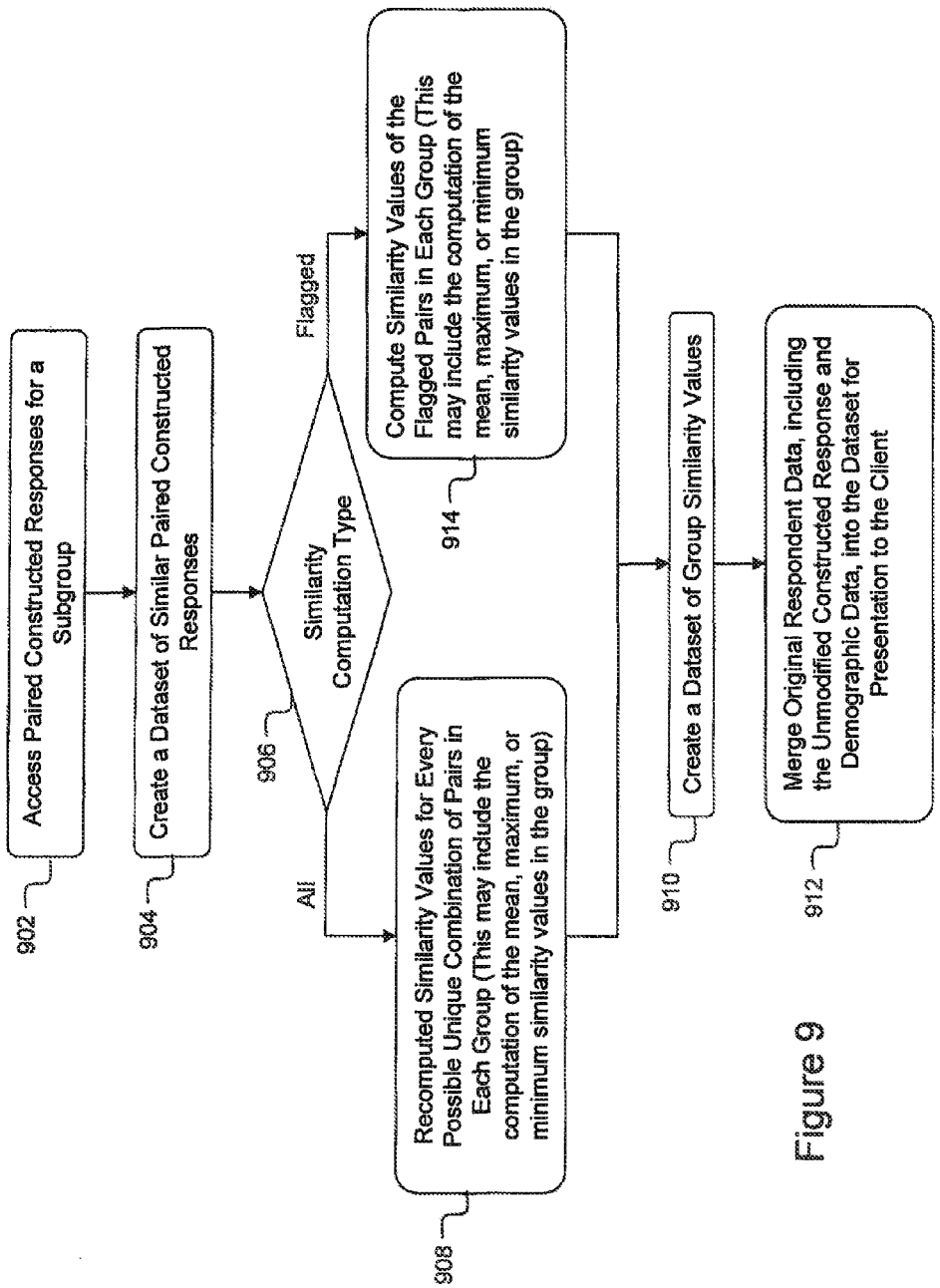
FIG. 9 is a diagram illustrating the process and/or data flow of plagiarism detection within a group according to one embodiment of the present invention.

FIG. 9 is a diagram illustrating the process and/or data flow of plagiarism detection within a similarity group according to one embodiment of the present invention. At step 902, the paired responses are accessed for a given subgroup. At step 904, a dataset is constructed from the paired responses accessed at step 902. At step 906 it is determined if the similarity computation type is "All" or "Flagged." If the similarity computation type is "All," then similarity values are recomputed for every possible unique combination of pairs in each group at step 908. If the similarity computation type is "Flagged," at step 914 the similarity values are computed only for the flagged pairs in each group. At steps 908 and 914, any or all of the mean, maximum, and minimum similarity values may be computed for the group. At step 910, a dataset of the computed group similarity values is created. At step 912, the newly created dataset is merged with the original respondent data, including the unmodified constructed response and demographic data, so that it can be presented to a third party, such as client.

In one embodiment of the present invention the plagiarism detection system and/or method is integrated with an existing test administration system and/or program. Because of this integration it is possible for the plagiarism detection of the present invention to be conducted in parallel to the automated or manual scoring of test question responses. The detection of potential plagiarism does not affect the scoring of responses, or the recording and reporting of results. In the event that plagiarism is confirmed through a separate review, the scores of the plagiarized response may be voided.

An embodiment of the present invention determines if plagiarism has occurred by assessing a set of responses for the following qualities: that the responses are nearly identical, that the responses are the usually incorrect responses, and that the responses are uncommon responses. However, this embodiment is not intended to make a final determination of plagiarism, but rather to identify possible instances of plagiarism for further review. This embodiment of the present invention is overly inclusive with the assumption that many of the responses that have been "flagged" for further review will ultimately not reveal an instance of plagiarism.

Further, according to some embodiments of the current invention, post-processing may be performed to improve the understandability of the results of the afore mentioned embodiments.

The systems, processes, and components set forth in the present description may be implemented using one or more general purpose computers, microprocessors, or the like programmed according to the teachings of the present specification, as will be appreciated by thoe skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely. The plagiarism detection system and method can be implemented on one or more computers. If more than one computer is used, the computers can be the same, or different from one another, but preferably each have at least one processor and at least one digital storage device capable of storing a set of machine readable instructions (i.e., computer software) executable by the at least one processor to perform the desired functions, where by "digital storage device" is meant any type of media or device for storing information in a digital format on a permanent or temporary basis such as, for example, a magnetic hard disk, flash memory, an optical disk, random access memory (RAM), etc.

The computer software stored on the computer ("software"), when executed by the computer's processor, causes the computer to retrieve constructed responses from a database or digital media. The software, when executed by the server's processor, also causes the server to process the constructed responses in the manner previously described.

The system of the present invention can be located at the testing facility or at a site remote from the testing facility. Communication between the scoring and testing computers can be accomplished via a direct connection or a network, such as a LAN, an intranet or the Internet.

It should be noted that the systems and methods described above could be applied to any type of written work, such as; papers, essays, books, magazine/newspaper articles, etc. In these instances, it may be necessary to first generate digitized forms of these works using known techniques, such as optical character recognition. Once digitized, the current invention could easily be modified to detect plagiarism in these works.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

The invention claimed is:

1. A computerized method for detecting plagiarism in a set of electronic constructed responses, the method performed by a computer comprising a processor executing a set of computer-readable instructions stored in a non-transitory computer readable memory, the method comprising the steps of:
    receiving, by the computer, the constructed responses over a communications network from a database;
    pre-processing, by the computer, the constructed responses in parallel to automated or manual scoring of the constructed responses;
    identifying, by the computer, at least two pairs of the constructed responses;
    calculating, by the computer, for each of the at least two pairs, a respective similarity value based on a minimum number of operations needed to transform one of the constructed responses of the pair into the other constructed response of the pair, wherein the operations include appending and deleting, but wherein the operation of appending to either end of a shorter constructed response of the pair and the operation of deleting from either end of a longer of the constructed response of the pair do not affect the similarity value;
    determining, by the computer, zero or more instances of plagiarism by comparing the similarity values with a similarity threshold indicative of plagiarism; and,
    performing, by the computer, in response to the determining of zero or more instances of plagiarism, at least one of: voiding a score in a score database over the network and terminating the process so that scores for the constructed responses are not voided.

2. The computerized method of claim 1, wherein said pre-processing step includes:
    reformatting the constructed responses; and
    removing common phrases from the constructed responses.

3. The computerized method of claim 2, wherein said reformatting step includes one or more of the steps of:
    changing all text to uppercase;
    removing white space; and
    removing separator characters.

4. The computerized method of claim 2, wherein said removing common phrases step includes:
    accessing a list of common phrases;
    reformatting the common phase;
    comparing common phrases contained in the list of common phrases with phrases contained in the constructed responses;
    deleting the common phrases from the constructed responses.

5. The computerized method of claim 1, wherein said calculating a respective similarity value for each pair of constructed responses includes:
    sorting the constructed responses into a list ordered by respective responding individual; and
    pairing each of the constructed responses with all other constructed responses later in the list.

6. The computerized method of claim 1, wherein the pre-processing includes segmenting each constructed response into a sequence of two or more substrings, and wherein calculating a respective similarity value for a pair of the constructed responses includes calculating similarity values for pairings of the substrings.

7. The computerized method of claim 1, wherein an operation includes inserting a single character, deleting a single character, or substituting a single character for another.

8. The computerized method of claim 1, wherein the respective similarity value for each pair of constructed responses is further based on a length of a shorter of the pair of constructed question responses.

9. The computerized method of claim 1, wherein said comparing said similarity value with a similarity threshold step includes:
    determining if the similarity value is greater than or equal to the similarity threshold.

10. The computerized method of claim 2, wherein said pre-processing step includes:
    comparing lengths of the test question constructed responses with a minimum length threshold.

11. The computerized method of claim 9, wherein, if the similarity value for a pair of constructed responses is greater than or equal to the similarity threshold, then the pair of constructed responses are flagged for further analysis.

12. The computerized method of claim 11, further comprising the step of:
    combining three or more flagged constructed responses into a group of similar responses, wherein at least two of the three or more constructed responses have a similarity value above the similarity threshold.

13. The computerized method of claim 12, wherein the group consists of similar constructed responses that have exceeded the similarity threshold with at least one other of the constructed responses in the group.

14. The computerized method of claim 12, further comprising the step of:
    calculating group similarity statistics for the group.

15. The computerized method of claim 14, wherein the group similarity statistics include at least one of similarity value mean, maximum, and minimum.

16. A system for detecting plagiarism in a set of constructed responses, said system comprising a computer with a processor and a memory device storing a set of digital instructions in a non-transitory computer-readable memory executable by said processor to perform the steps of:

receiving, by the computer, the constructed responses over a communications network from a database;

pre-processing, by the computer, the constructed responses in parallel to automated or manual scoring of the constructed responses;

identifying, by the computer, at least two pairs of the constructed responses;

calculating, by the computer, for each of the at least two pairs, a respective similarity value based on a minimum number of operations needed to transform one of the constructed responses of the pair into the other constructed response of the pair, wherein the operations include deleting, but wherein the operation of appending to either end of a shorter constructed response of the pair and the operation of deleting from either end of a longer of the constructed response of the pair do not affect the similarity value;

determining, by the computer, zero or more instances of plagiarism by comparing the similarity values with a similarity threshold indicative of plagiarism; and performing, by the computer, in response to the determining of zero or more instances of plagiarism, at least one of: voiding a score in a score database over the network and terminating the process so that scores for the constructed responses are not voided.

17. The system of claim 16, wherein said pre-processing step includes:
reformatting the constructed responses; and
removing common phrases from the constructed responses.

18. The system of claim 17, wherein said reformatting step includes one or more of the steps of:
changing all text to uppercase;
removing white space; and
removing separator characters.

19. The system of claim 17, wherein said removing common phrases step includes:
accessing a list of common phrases;
reformatting the common phrases;
comparing common phrases contained in the list of common phrases with phrases contained in the constructed responses;
deleting the common phrases from the constructed responses.

20. The system of claim 16, wherein said calculating a respective similarity value for each pair of constructed responses includes:
sorting the constructed responses into a list ordered by respective responding individual; and
pairing each of the constructed responses with all other constructed responses later in the list.

21. The system of claim 16, wherein the pre-processing includes segmenting each constructed response into a sequence of two or more substrings, and wherein calculating a respective similarity value for a pair of the constructed responses includes calculating similarity values for pairings of the substrings.

22. The system of claim 16, wherein an operation includes inserting a single character, deleting a single character, or substituting a single character for another.

23. The system of claim 16, wherein the respective similarity value for each pair of constructed responses is further based on a length of a shorter of the pair of constructed question responses.

24. The system of claim 16, wherein said comparing said similarity value with a similarity threshold step includes:
determining if the similarity value is greater than or equal to the similarity threshold.

25. The system of claim 17, wherein said pre-processing step includes:
comparing lengths of the test question constructed responses with a minimum length threshold.

26. The system of claim 24, wherein, if the similarity value for a pair of constructed responses is greater than or equal to the similarity threshold, then the pair of constructed responses are flagged for further analysis.

27. The system of claim 26, further comprising the step of:
combining three or more flagged constructed responses into a group of similar responses, wherein at least two of the three or more constructed responses have a similarity value above the similarity threshold.

28. The system of claim 27, wherein the group consists of similar constructed responses that have exceeded the similarity threshold with at least one other of the constructed responses in the group.

29. The system of claim 27, further comprising the step of:
calculating group similarity statistics for the group.

30. The system of claim 29, wherein the group similarity statistics include at least one of similarity value mean, maximum, and minimum.

31. A system for detecting plagiarism in a set of constructed responses, comprising:

means for receiving, by a computer, the constructed responses over a communications network from a database;

means for pre-processing, by the computer, the constructed responses in parallel to automated or manual scoring of the constructed responses;

means for identifying, by the computer, at least two pairs of the constructed responses;

means for calculating, by the computer, for each of the at least two pairs, a respective similarity value based on a minimum number of operations needed to transform one of the constructed responses of the pair into the other constructed response of the pair, wherein the operations include appending and deleting, but wherein the operation of appending to either end of a shorter constructed response of the pair and the operation of deleting from either end of a longer of the constructed response of the pair do not affect the similarity value;

means for determining, by the computer, zero or more instances of plagiarism by comparing the similarity values with a similarity threshold indicative of plagiarism, and means for performing, by the computer, in response to the determining of zero or more instances of plagiarism, at least one of: voiding a score in a score database over the network and terminating the process so that scores for the constructed responses are not voided.

32. The system of claim 31, wherein said means for pre-processing includes:
means for reformatting the constructed responses; and
means for removing common phrases from the constructed responses.

33. The system of claim 32, wherein said means for reformatting includes one or more of:
means for changing all text to uppercase;
means for removing white space; and
means for removing separator characters.

34. The system of claim 32, wherein said means for removing common phrases includes:
means for accessing a list of common phrases;
means for reformatting common phrases;
means for comparing common phrases contained in the list of common phrases with phrases contained in the constructed responses;
means for deleting the common phrases from the constructed responses.

35. The system of claim 31, wherein said means for calculating a respective similarity value for each pair of constructed responses includes:
means for sorting the constructed responses into a list ordered by respective responding individual; and
means for pairing each of the constructed responses with all other constructed responses later in the list.

36. The system of claim 31, wherein the pre-processing includes segmenting each constructed response into a sequence of two or more substrings, and wherein calculating a respective similarity value for a pair of the constructed responses includes calculating similarity values for pairings of the substrings.

37. The system of claim 31, wherein an operation comprises inserting a single character, deleting a single character, or substituting a single character for another.

38. The system of claim 31, wherein the respective similarity value for each pair of constructed responses is further based on a length of a shorter of the pair of constructed question responses.

39. The system of claim 31, wherein said means for comparing said similarity value with a similarity threshold includes:
means for determining if the similarity value is greater than or equal to the similarity threshold.

40. The system of claim 31, wherein said means for pre-processing includes:
means for comparing lengths of the test question constructed responses with a minimum length threshold.

41. The system of claim 39, wherein, if the similarity value for a pair of constructed responses is greater than or equal to the similarity threshold, then the pair of constructed responses are flagged for further analysis.

42. The system of claim 41, further comprising:
means for combining three or more flagged constructed responses into a group of similar responses, wherein at least two of the three or more constructed responses have a similarity value above the similarity threshold.

43. The system of claim 42, wherein the group consists of similar constructed responses that have exceeded the similarity threshold with at least one other of the constructed responses in the group.

44. The system of claim 43, further comprising:
means for calculating group similarity statistics for the group.

45. The system of claim 44, wherein the group similarity statistics include at least one of similarity value mean, maximum, and minimum.

46. A non-transitory computer-readable storage medium having computer executable program instructions stored therein for detecting plagiarism in a set of constructed responses, by performing the following operations:
receiving, by a computer, the constructed responses over a communications network from a database;
pre-processing, by the computer, the constructed responses in parallel to automated or manual scoring of the constructed responses;
identifying, by the computer, at least two pairs of the constructed responses;
calculating, by the computer, for each of the at least two pairs, a respective similarity value based on a minimum number of operations needed to transform one of the constructed responses of the pair into the other constructed response of the pair, wherein the operations include appending and deleting, but wherein the operation of appending to either end of a shorter constructed response of the pair and the operation of deleting from either end of a longer of the constructed response of the pair do not affect the similarity value;
determining, by the computer, zero or more instances of plagiarism by comparing the similarity values with a similarity threshold indicative of plagiarism; and
performing, by the computer, in response to the determining of zero or more instances of plagiarism, at least one of: voiding a score in a score database over the network and terminating the process so that scores for the constructed responses are not voided.

47. The non-transitory computer-readable storage medium of claim 46, wherein said operation of pre-processing includes:
reformatting the constructed responses; and
removing common phrases from the constructed responses.

48. The non-transitory computer-readable storage medium of claim 47, wherein said reformatting includes one or more of:
changing all text to uppercase;
removing white space; and
removing separator characters.

49. The non-transitory computer-readable storage medium of claim 47, wherein said removing common phrases includes:
accessing a list of common phrases;
reformatting common phrases;
comparing common phrases contained in the list of common phrases with phrases contained in the constructed responses;
deleting the common phrases from the constructed responses.

50. The non-transitory computer-readable storage medium of claim 46, wherein said operation of calculating a respective similarity value for each pair of constructed responses includes:
sorting the constructed responses into a list ordered by respective responding individual; and
pairing each of the constructed responses with all other constructed responses later in the list.

51. The non-transitory computer-readable storage medium of claim 46, wherein the pre-processing includes segmenting each constructed response into a sequence of two or more substrings, and wherein calculating a respective similarity value for a pair of the constructed responses includes calculating similarity values for pairings of the substrings.

52. The non-transitory computer-readable storage medium of claim 46, wherein an operation comprises inserting a single character, deleting a single character, or substituting a single character for another.

53. The non-transitory computer-readable storage medium of claim 46, wherein the respective similarity value for each pair of constructed responses is further based on a length of a shorter of the pair of constructed question responses.

54. The non-transitory computer-readable storage medium of claim 46, wherein said operation of comparing said similarity value with a similarity threshold includes:

determining if the similarity value is greater than or equal to the similarity threshold.

55. The non-transitory computer-readable storage medium of claim 46, wherein said pre-processing includes:
comparing lengths of the test question constructed responses with a minimum length threshold.

56. The non-transitory computer-readable storage medium of claim 46, wherein, if the similarity value for a pair of constructed responses is greater than or equal to the similarity threshold, then the pair of constructed responses are flagged for further analysis.

57. The non-transitory computer-readable storage medium of claim 56, further comprising the operation of:
combining three or more flagged constructed responses into a group of similar responses, wherein at least two of the three or more constructed responses have a similarity value above the similarity threshold.

58. The non-transitory computer-readable storage medium of claim 57, wherein the group consists of similar constructed responses that have exceeded the similarity threshold with at least one other of the constructed responses in the group.

59. The non-transitory computer-readable storage medium of claim 57, further comprising the operation of:
calculating group similarity statistics for the group.

60. The non-transitory computer-readable storage medium of claim 59, wherein the group similarity statistics include at least one of similarity value mean, maximum, and minimum.

\* \* \* \* \*